Patented Feb. 9, 1932

1,844,397

UNITED STATES PATENT OFFICE

HANS KÄMMERER, OF MANNHEIM, AND KARL HOLZACH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF DYESTUFFS CONTAINING CHROMIUM

No Drawing. Application filed February 17, 1928, Serial No. 255,175, and in Germany August 6, 1925.

This application is a continuation-in-part of our co-pending application Ser. No. 124,776, filed July 24, 1926, in which application we have shown that chromium compounds of o-hydroxy-azo-dyestuffs are most advantageously produced by carrying out the chromation in a closed vessel, at a temperature sufficiently above 100° C. to produce superatmospheric pressure, but below the temperature at which the dyestuffs are destroyed.

Now the present application is for the chromation of a specific class of dyestuffs under elevated pressure, namely such dyestuffs as are obtainable by coupling a diazotized o-hydroxy-amino compound with a pyrazolone or substitution product thereof. Also in the case of such initial dyestuffs great advantages are experienced by carrying out the chromation under elevated pressure and in particular the time of heating, necessary for the formation of the chromium compounds is considerably reduced. As has been broadly stated already in the aforesaid application Ser. No. 124,776, it is often advantageous also in this specific case to subject the dyestuffs containing chromium so obtained to a subsequent treatment with alkaline agents in the manner described in the German Patent 419,825.

The following example will further illustrate the nature of the said invention which however is not limited thereto. The parts are by weight.

Example 42 parts of the azo dyestuffs, obtainable in the usual manner from diazotized 4-nitro-2-aminophenol-6-sulphonic acid and 3-methyl-1-phenyl-5-pyrazolone, are stirred into 700 parts of water and a solution of chromium formate corresponding to 8 parts of chromium oxid is added. The mixture is heated for 3 to 4 hours to 120° centigrade in an enamelled autoclave provided with a stirrer, and then allowed to cool. The chromium compound of the dyestuff is precipitated by the addition of common salt.

The product may be directly used for dyeing after it has been dried or it may be converted into the sodium salt which is more readily soluble in water by treatment with alkaline agents, such as sodium carbonate or caustic soda. The new dyestuff dyes wool from an acid bath clear yellowish-orange shades of very good fastness.

The complex chromium compound of the dyestuff obtainable from diazotized 4-chlor-2-amino-phenol-6-sulphonic acid and 3-methyl-1-phenyl-5-pyrazolone which may be obtained in a similar manner under pressure, dyes wool very fast red shades.

What we claim is:

1. In the production of chromium compounds of o-hydroxyazo dyestuffs obtainable from an o-hydroxydiazo compound and a pyrazolone, the step which comprises heating an o-hydroxyazo dyestuff of the said kind with a chromium compound capable of reacting therewith, in a closed vessel at a temperature sufficiently above 100° C. to produce superatmospheric pressure, but below the temperature at which the dyestuff is destroyed.

2. The process of producing a chromiferous o-hydroxy-azo dyestuff which comprises heating the o-hydroxy-azo dyestuff obtainable from diazotized 4-nitro-2-aminophenol-6-sulphonic acid and 3-methyl-1-phenyl-5-pyrazolone with a chromium formate solution in a closed vessel at 120° C.

In testimony whereof we have hereunto set our hands.

HANS KÄMMERER.
KARL HOLZACH.